US012767095B2

(12) United States Patent
Edwards et al.

(10) Patent No.: US 12,767,095 B2
(45) Date of Patent: Oct. 20, 2026

(54) SENSOR CLEANING DEVICE

(71) Applicant: KAUTEX TEXTRON GmbH & Co. KG, Bonn (DE)

(72) Inventors: James Edwards, Rugeley (GB); Nelly Sierra, Bonn (DE)

(73) Assignee: KAUTEX TEXTRON GmbH & Co. KG, Bonn (DE)

( * ) Notice: Subject to any disclaimer, the term of this patent is extended or adjusted under 35 U.S.C. 154(b) by 128 days.

(21) Appl. No.: 18/688,050

(22) PCT Filed: Aug. 30, 2021

(86) PCT No.: PCT/EP2021/073896

§ 371 (c)(1),
(2) Date: Feb. 29, 2024

(87) PCT Pub. No.: WO2023/030604

PCT Pub. Date: Mar. 9, 2023

(65) Prior Publication Data

US 2024/0425016 A1 Dec. 26, 2024

(51) Int. Cl.

*B60S 1/52* (2006.01)
*B60S 1/48* (2006.01)
*B60S 1/54* (2006.01)

(52) U.S. Cl.

CPC ................. *B60S 1/52* (2013.01); *B60S 1/487* (2013.01); *B60S 1/54* (2013.01)

(58) Field of Classification Search

None

See application file for complete search history.

(56) References Cited

U.S. PATENT DOCUMENTS 3,014,251 A 12/1961 Stern
4,185,777 A 1/1980 Bauer
(Continued)

FOREIGN PATENT DOCUMENTS

EP 1187682 8/2008
JP 2003532511 11/2003
(Continued)

OTHER PUBLICATIONS

PCT International Search Report for corresponding PCT Application No. PCT/EP2021/073896 dated May 31, 2022, 3 pages.

*Primary Examiner* — Omair Chaudhri
(74) *Attorney, Agent, or Firm* — Lee & Hayes, P.C.

(57) ABSTRACT

A sensor cleaning device for cleaning a motor vehicle sensor includes a housing with at least one first housing inlet, at least one second housing inlet, and a housing outlet opening for dispensing fluid introduced into the housing via the at least one first housing inlet, and/or the at least one second housing inlet. The device also includes a fluid distribution device that includes first distribution inlets corresponding to first housing inlets; and first distribution outlets corresponding to first distribution inlets. The fluid distribution device further includes second distribution inlets corresponding to second housing inlets; and second distribution outlets corresponding to at least twice the number of second distribution inlets. The fluid distribution device is insertable into the housing. Each first distribution inlet is in fluid communication with one first housing inlet and each second distribution inlet is in fluid communication with one second housing inlet when the fluid distribution device is inserted into the housing.

17 Claims, 6 Drawing Sheets

(56) References Cited

U.S. PATENT DOCUMENTS

Figure 1:
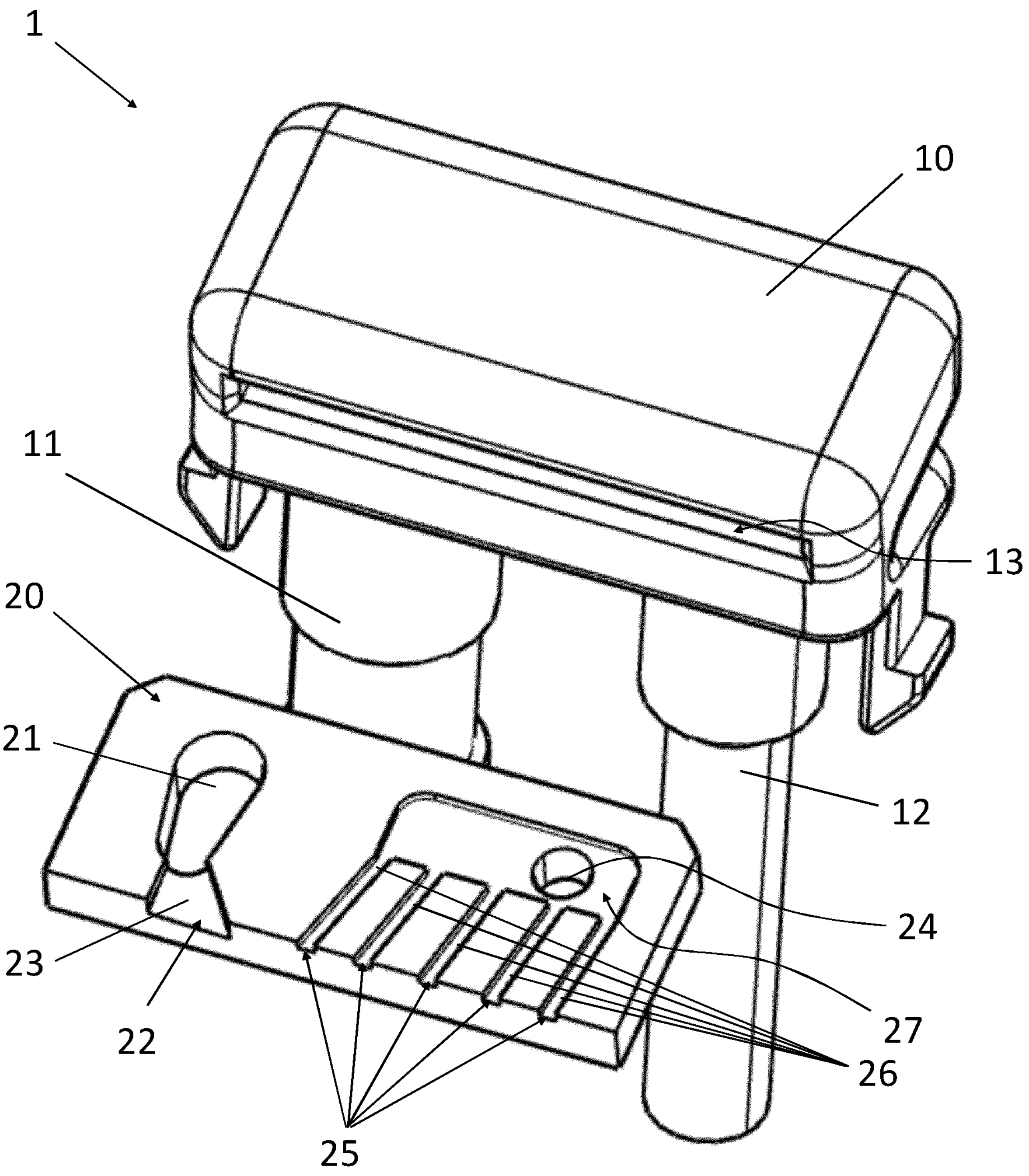

| | | | | |
|---|---|---|---|---|
| 4,212,425 | A * | 7/1980 | Schlick | B05B 1/24 219/505 |
| 7,354,008 | B2 | 4/2008 | Hester et al. | |
| 7,677,480 | B2 | 3/2010 | Russell et al. | |
| 10,882,495 | B2 | 1/2021 | Galera et al. | |
| 2002/0005440 | A1* | 1/2002 | Holt | B05B 15/652 239/284.2 |
| 2003/0234303 | A1* | 12/2003 | Berning | F15C 1/22 239/589.1 |
| 2004/0117937 | A1 | 6/2004 | Maruyama et al. | |
| 2004/0164189 | A1 | 8/2004 | Berning et al. | |
| 2004/0251315 | A1* | 12/2004 | Maruyama | B60S 1/52 239/284.1 |
| 2005/0045740 | A1* | 3/2005 | Takemoto | B60S 1/52 239/284.1 |
| 2010/0072307 | A1* | 3/2010 | Hester | B05B 1/08 239/589.1 |
| 2011/0061692 | A1* | 3/2011 | Gopalan | B60S 1/52 134/169 R |
| 2011/0266375 | A1* | 11/2011 | Ono | B60S 1/52 239/589 |
| 2016/0030954 | A1* | 2/2016 | Gopalan | B60S 1/52 239/466 |
| 2016/0318486 | A1* | 11/2016 | Weitzel | B60S 1/52 |
| 2017/0313286 | A1* | 11/2017 | Galera | B08B 3/02 |
| 2019/0202410 | A1* | 7/2019 | Zhao | B60S 1/52 |
| 2019/0337490 | A1* | 11/2019 | Kawamura | B60S 1/56 |
| 2020/0061643 | A1* | 2/2020 | Rachow | B05B 7/0892 |
| 2020/0254464 | A1 | 8/2020 | Romack et al. | |
| 2020/0307524 | A1 | 10/2020 | Morita et al. | |
| 2020/0398795 | A1* | 12/2020 | Sykula | G02B 27/0006 |
| 2023/0126082 | A1* | 4/2023 | Trebouet | B60S 1/56 15/320 |
| 2024/0198976 | A1* | 6/2024 | Baudouin | B60S 1/52 |
| 2024/0416365 | A1* | 12/2024 | Rachow | B05B 1/14 |

FOREIGN PATENT DOCUMENTS

| | | |
|---|---|---|
| JP | 2005533707 | 11/2005 |
| JP | 2007112383 | 5/2007 |
| WO | WO2020163726 | 8/2020 |

* cited by examiner

SENSOR CLEANING DEVICE

The present invention relates to a sensor cleaning device for cleaning motor vehicle sensors.

This Application claims priority to PCT Application No. PCT/EP/2021073896, filed Aug. 30, 2021, the contents of which is incorporated herein by reference.

Motor vehicle sensors increase the safety and the comfort of motor vehicles and can make autonomous driving possible. By way of example motor vehicle sensors can be cameras operating in the visible light spectrum or in the infrared spectrum. Moreover, motor vehicle sensors can be radar sensors, LiDAR sensors and ultrasonic sensors.

During the operation of a motor vehicle the motor vehicle sensors are exposed to environmental influences such like dirt from the road swirled by a preceding car, bird droppings, rain and so on.

To safeguard the operational reliability of motor vehicle sensors it is important that the front face through which the optical or infrared or radar or ultrasonic signals of the motor vehicle sensor travel through is kept clean and that dirt on this face is reliably removed. By way of example an optical signal can be a laser signal or a laser beam.

It is known in the prior art that fluid in the form of water and in the form of air are used to clean the front face of motor vehicle sensors whereby the front face of the motor vehicle sensor is exposed to water and air ejected from a sensor cleaning device.

Since different motor vehicle sensors exhibit different sizes and different geometries different sensor cleaning devices have to be used for the different sensor cleaning devices to achieve acceptable cleaning results.

One object underlying the present invention is to provide a sensor cleaning device which can more easily be used for cleaning different motor vehicle sensors without the need to change to overall construction of the sensor cleaning device.

This object of the present disclosure is solved by a sensor cleaning device exhibiting the features as described herein. Many different embodiments of the sensor cleaning device are disclosed hereinafter.

More precisely, the object of the present invention is solved by a sensor cleaning device for cleaning a motor vehicle sensor, wherein the sensor cleaning device exhibits a housing with at least one first housing inlet, at least one second housing inlet and with a housing outlet opening for dispensing fluid introduced into the housing via the at least one first housing inlet and/or the at least one second housing inlet. The sensor cleaning device furthermore exhibits a fluid distribution device for guiding fluid, which is introduced into the housing via the at least one first housing inlet and the at least one second housing inlet, to the housing outlet opening, wherein the fluid distribution device exhibits a number of first distribution inlets corresponding to the number of first housing inlets and a number of first distribution outlets corresponding to at least the number of first distribution inlets, and wherein the fluid distribution device exhibits a number of second distribution inlets corresponding to the number of second housing inlets and a number of second distribution outlets corresponding to at least twice the number of second distribution inlets. The fluid distribution device is insertable into the housing, wherein each first distribution inlet is in fluid communication with one first housing inlet and each second distribution inlet is in fluid communication with one second housing inlet when the fluid distribution device is inserted into the housing.

The correspondingly designed sensor cleaning device exhibits the advantage that the sensor cleaning device can be used for different motor vehicle sensors with different sizes and different geometries simply by exchanging the fluid distribution device. By way of example the correspondingly designed sensor cleaning device can be used for a motor vehicle sensor which exhibits a comparatively small front face whereby a fluid distribution device exhibiting e.g. only three second distribution outlets is inserted into the housing. The same sensor cleaning device can be used for a motor vehicle sensor which exhibits a comparatively large front face whereby a fluid distribution device exhibiting e.g. four or five or six or even more second distribution outlets is inserted into the housing. Moreover, the assembly of the correspondingly built sensor cleaning device is extremely easy.

If the sensor cleaning device exhibits one first housing inlet and one second housing inlet the sensor cleaning device can be described in the following way: a sensor cleaning device for cleaning a motor vehicle sensor, wherein the sensor cleaning device exhibits a housing with a first housing inlet, a second housing inlet and with a housing outlet opening for dispensing fluid introduced into the housing via the first housing inlet and/or the second housing inlet. The sensor cleaning device furthermore exhibits a fluid distribution device for guiding fluid, which is introduced into the housing via the first housing inlet and the second housing inlet, to the housing outlet opening, wherein the fluid distribution device exhibits a first distribution inlet and at least one first distribution outlet and a second distribution inlet and at least two second distribution outlets, and wherein the fluid distribution device is insertable into the housing, and wherein the first distribution inlet is in fluid communication with the first housing inlet and the second distribution inlet is in fluid communication with the second housing inlet when the fluid distribution device is inserted into the housing.

If the sensor cleaning device exhibits two first housing inlets and two second housing inlets the sensor cleaning device can be described in the following way: The housing of the sensor cleaning device exhibits two first housing inlets and two second housing inlets wherein the fluid introduced into the housing via the first housing inlets and/or the second housing inlets is dispensable through the housing outlet opening, wherein the fluid distribution device exhibits two first distribution inlets and at least two first distribution outlets and two second distribution inlets and at least two second distribution outlets, wherein each first distribution inlet is in fluid communication with one first housing inlet and each second distribution inlet is in fluid communication with one second housing inlet when the fluid distribution device is inserted into the housing.

The motor vehicle sensor which is cleaned by the sensor cleaning device by way of example can be a Lidar sensor, a radar sensor, an optical sensor, a lens of an optical sensor, an ultrasonic sensor, or the like.

By way of example the first housing inlet can be used as a liquid inlet for letting a liquid (e.g. water or cleaning solution) into the housing. Therefore, the first housing inlet also can be named a liquid inlet and a liquid housing inlet, respectively.

Furthermore, by way of example the second housing inlet can be used as a gas inlet and an air inlet, respectively, for letting a gas (e.g. air or another gas) into the housing. Therefore, the second housing inlet also can be named a gas inlet, an air inlet, a gas housing inlet and an air housing inlet, respectively. Gas is also a fluid.

By way of example the first housing inlet and the second housing inlet can each be designed as an inlet nozzle.

By way of example the sensor cleaning device exhibits exactly one outlet opening.

The fluid which can be dispensed through the housing outlet opening is the fluid introduced into the housing via the first housing inlet and via the second housing inlet.

The fluid distribution device also can be named a chip.

By way of example the fluid distribution device is exchangeable inserted into the housing.

The first distribution inlet is in fluid communication with the first distribution outlet opening.

The second distribution inlet is in fluid communication with all second distribution outlets.

Since the first distribution inlet is in fluid communication with the first housing inlet and the second distribution inlet is in fluid communication with the second housing inlet when the distribution device is inserted into the housing, fluid introduced via the first housing inlet is dispensed through the housing outlet opening via the first distribution outlet, and fluid introduced via the second housing inlet is dispensed through the housing outlet opening via the at least two second distribution outlets.

By way of example the fluid distribution device exhibits two first distribution outlets.

By way of example the fluid distribution device exhibits three or more first distribution outlets.

By way of example the fluid distribution device exhibits three second distribution outlets.

By way of example the fluid distribution device exhibits four second distribution outlets.

By way of example the fluid distribution device exhibits five second distribution outlets.

By way of example the fluid distribution device exhibits six second distribution outlets.

By way of example the fluid distribution device exhibits more than six second distribution outlets.

By way of example the fluid distribution device is at least partially build from a plastic. For example, the fluid distribution device is built as a injection molded component.

In the installed state, i.e. when the sensor cleaning device is installed in a motor vehicle, by way of example the first distribution outlet and the second distribution outlets can be arranged on a same horizontal level. Moreover, In the installed state, i.e. when the sensor cleaning device is installed a motor vehicle, by way of example the first distribution outlet and the second distribution outlets can be arranged on different horizontal levels.

Preferably each first distribution outlet is fluidically connected with a first distribution inlet via a first outlet channel.

The correspondingly designed sensor cleaning device exhibits a very simple construction and therefore is very easy to be fabricated. Preferably, the first outlet channel is realized by first recess in the fluid distribution device.

More preferably, a cross section of at least one of the first outlet channels increases in a direction from the first distribution inlet to the first distribution outlet.

The correspondingly designed sensor cleaning device exhibits the advantage the liquid dispensed through the first distribution outlet also is divergent and therefore larger motor vehicle sensor and front faces of motor vehicle sensors, respectively, can be reliably cleaned by the fluid dispensed from the first distribution outlet.

Preferably, the fluid distribution device exhibits at least one distribution chamber into which a second distribution inlet ends, wherein each of the at least two second distribution outlets is fluid-connected with a distribution chamber via a second outlet channel.

The correspondingly designed sensor cleaning device exhibits the advantage that the at least two second outlet channels are equally provided with fluid. By way of example this fluid is air or another gas. Moreover, the design of the correspondingly designed fluid distribution device is simple and can therefore be easily produced.

The correspondingly designed sensor cleaning device exhibits a very simple construction and therefore is very easy to be fabricated. Preferably, the second outlet channels are realized by second recesses in the fluid distribution device.

The fluid distribution device exhibits the same number of second outlet channels as the number of second distribution outlets.

By way of example all second outlet channels can have a rectangular cross section shape. Moreover, by way of example all second outlet channels can have a circular or elliptic cross section shape. Moreover, by way of example the different second outlet channels can have cross section shapes which are different to each other.

Preferably, the sum of the cross sectional areas of all second outlet channels is in the range of 0.5 $mm^2$ to 3 $mm^2$.

Preferably, the sum of the cross sectional areas of all second outlet channels is in the range of 0.7 $mm^2$ to 2 $mm^2$. Preferably, the sum of the cross sectional areas of all second outlet channels is in the range of 0.8 $mm^2$ to 1.5 $mm^2$. Preferably, the sum of the cross sectional areas of all second outlet channels is in the range of 0.9 $mm^2$ to 1.1 $mm^2$.

It has been found out by the inventors of the present invention that surprisingly when the sum of the cross sectional areas of all second outlet channels is in the above specified ranges a very good compromise between a good directionality (a high directionality is desired) of the fluid/air dispensed through the second distribution outlets and the flow rate (a high flow rate is desired) through all second distribution outlets is achieved.

Preferably, the at least two second outlet channels each exhibit a length (L) in the range between 2 mm and 6 mm.

Preferably, the at least two second outlet channels each exhibit a length in the range between 3 mm and 5 mm. Preferably, the at least two second outlet channels each exhibit a length in the range between 3.5 mm and 4.5 mm.

It has been found out by the inventors of the present invention that surprisingly when the length of second outlet channels is in the above specified ranges a very good compromise between a good directionality (a high directionality is desired) of the fluid/air dispensed through the second distribution outlets and the flow rate (a high flow rate is desired) through all second distribution outlets is achieved.

Preferably, the cross sections of at least two second outlet channels are different to each other.

A correspondingly designed sensor cleaning device exhibits the advantage that the application of fluid discharged from the housing opening and the second distribution outlets, respectively, to the optical sensor can be designed as required.

By way of example, if the cross section(s) of the second outlet channel(s) opening out into the second outlet opening (s) facing the center of the motor vehicle sensor is (are) bigger or smaller than the cross section(s) of the second outlet channel(s) opening out into the second outlet opening (s) facing boundary areas of the motor vehicle sensor, then the center of the motor vehicle sensor is exposed with a different amount of fluid than the boundary of the motor vehicle sensor.

Preferably, the at least one first outlet channel and the second outlet channels are directed towards each other.

Since the first outlet channel and the second outlet channel are directed toward each other each longitudinal axis of each second outlet channel is directed towards the longitudinal axis of the first outlet channel.

The correspondingly designed sensor cleaning device exhibits the advantage that excellent cleaning results are achieved.

Preferably, the fluid distribution device is insertable into the housing via the housing outlet opening.

The correspondingly designed sensor cleaning device exhibits a very simple design since the housing outlet opening which anyway has to be provided is used for inserting the fluid distribution device into the housing of the sensor cleaning device.

Preferably, the fluid distribution device is insertable into the housing via a mounting opening.

By way of example the mounting opening is arranged opposite to the housing outlet opening. Moreover, it is possible that the mounting opening is arranged on a side face of the housing.

Preferably, the fluid distribution device exhibits at least one locking member for positively connecting the fluid distribution device with the housing.

The correspondingly designed sensor cleaning device exhibits the advantage that the mounting of the fluid distribution device in the housing is very easy and moreover very reliable.

Preferably, the sensor cleaning device exhibits a heating device for heating the first outlet inlet and/or the fluid distribution device.

The correspondingly designed sensor cleaning device exhibits the advantage that also in cold environments below 0° C. the sensor cleaning device functions reliably.

Preferably, the fluid distribution device is at least partially build from a metal.

The correspondingly designed sensor cleaning device is very durable and moreover exhibits a high thermal conductivity. Therefore, especially when the sensor cleaning device exhibits a heating device the correspondingly designed sensor cleaning device exhibits the advantage that also in cold environments below 0° C. the sensor cleaning device functions reliably.

Preferably, the sensor cleaning device exhibits more than one fluid distribution device accommodated in the housing of the sensor cleaning device.

The correspondingly designed sensor cleaning device exhibits the advantage that also very large motor vehicle sensors reliably can be cleaned by the sensor cleaning device.

Figure 2A:
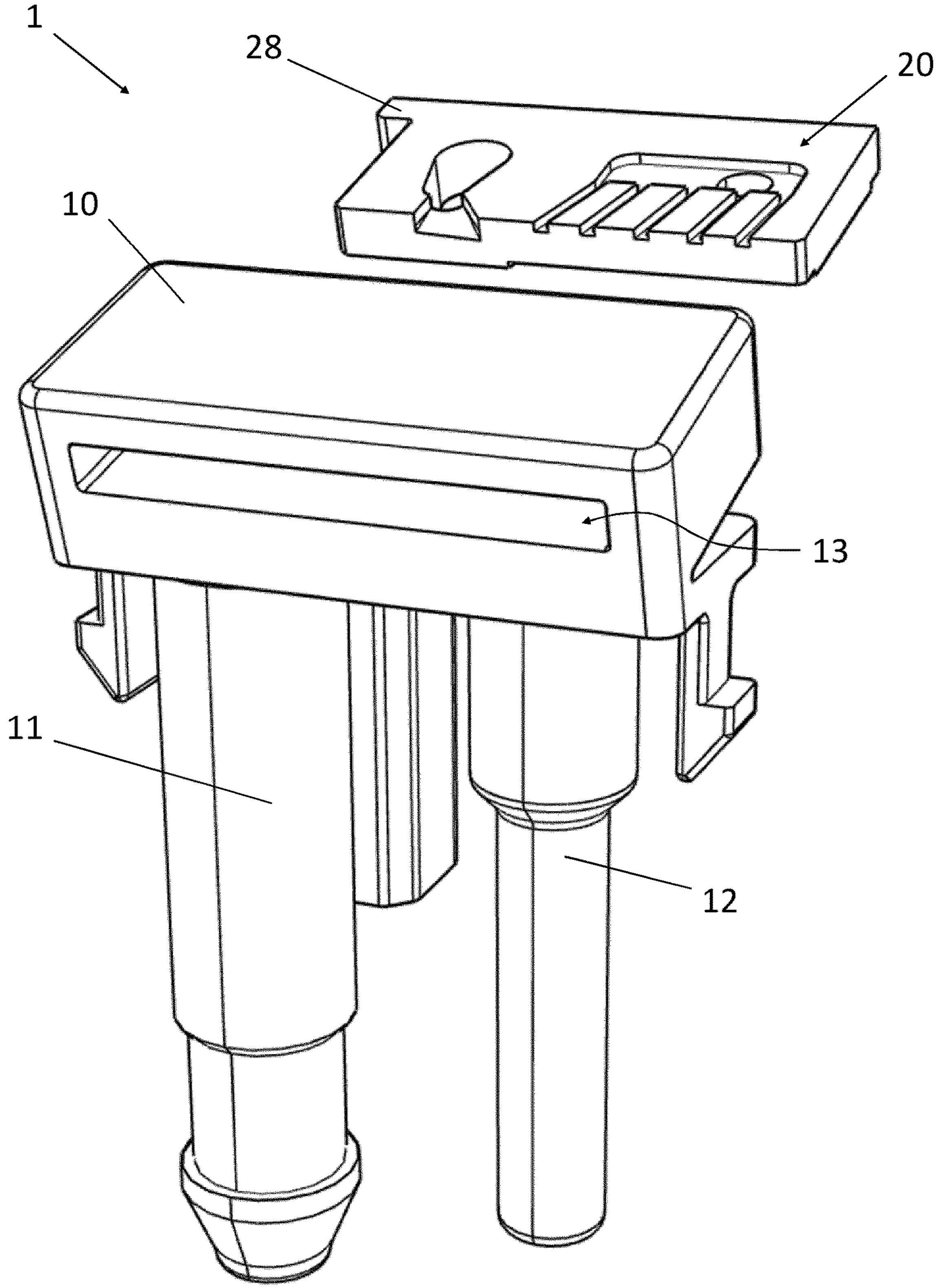
Figure 2B:
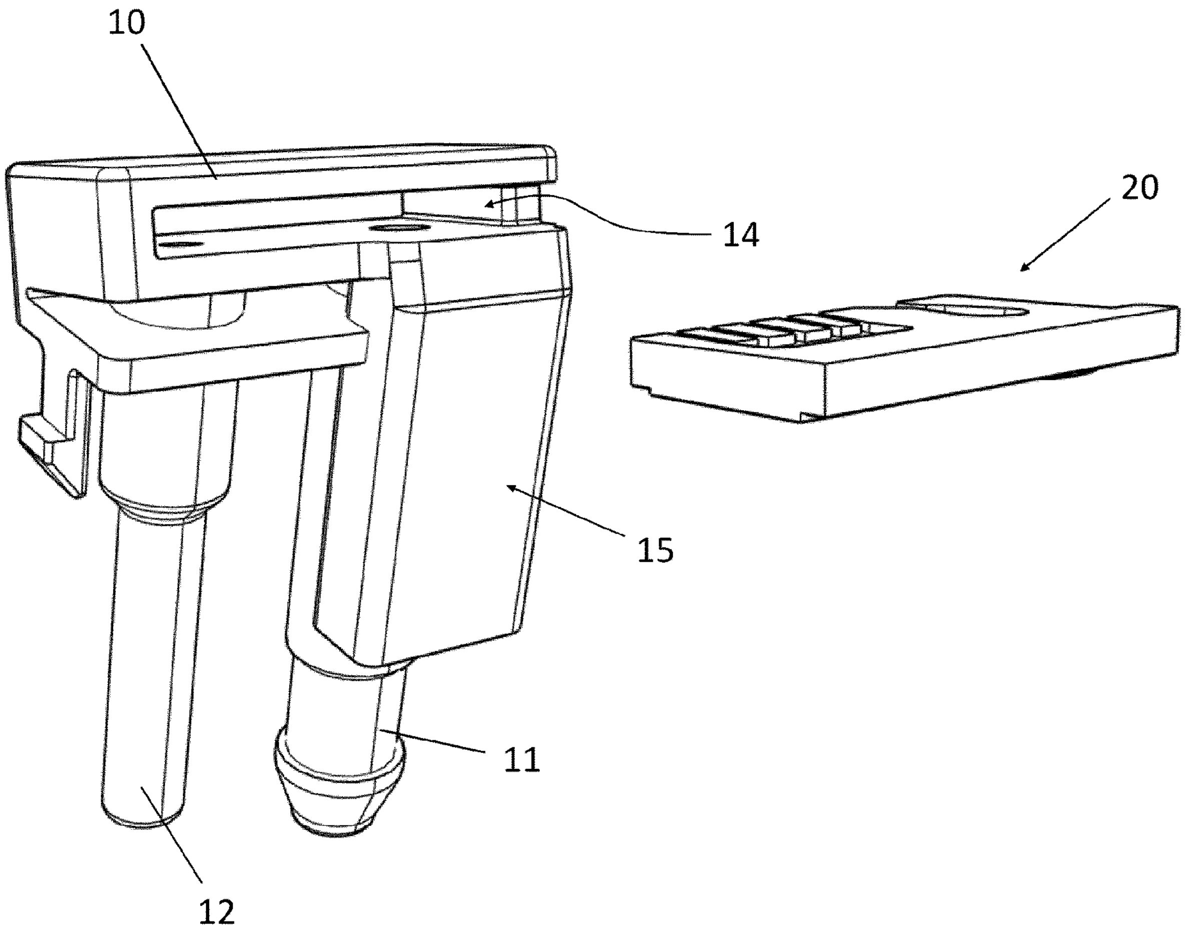
Figure 3A:
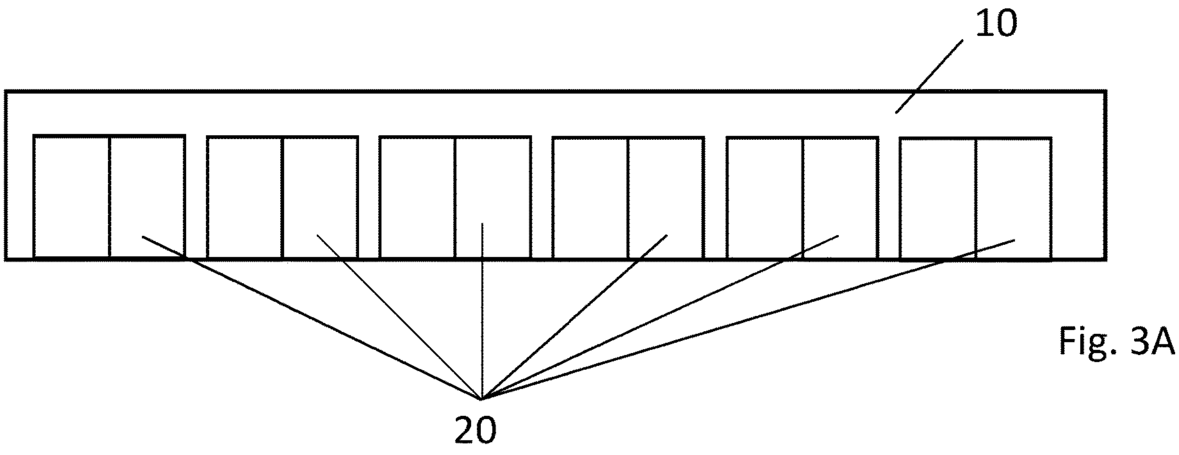
Figure 3B:
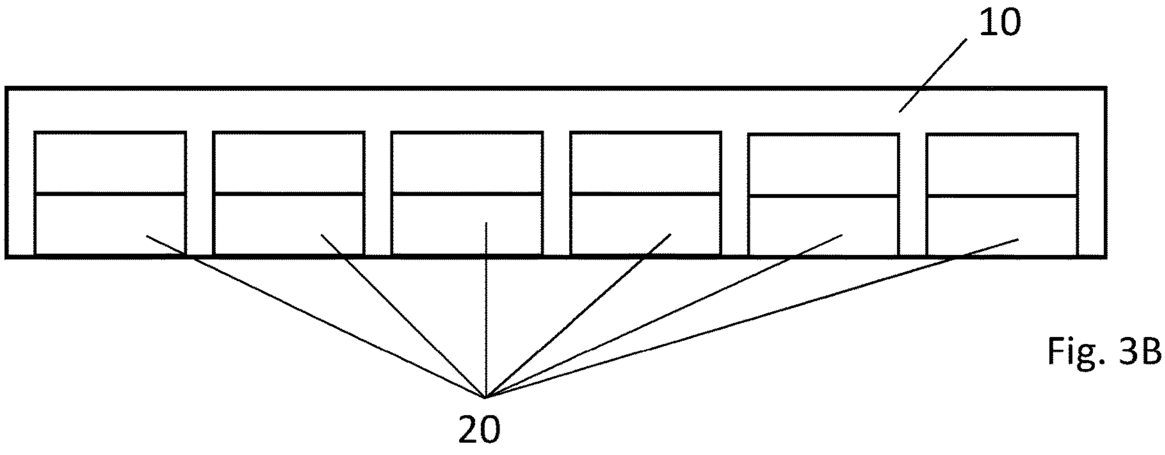
Figure 4A:
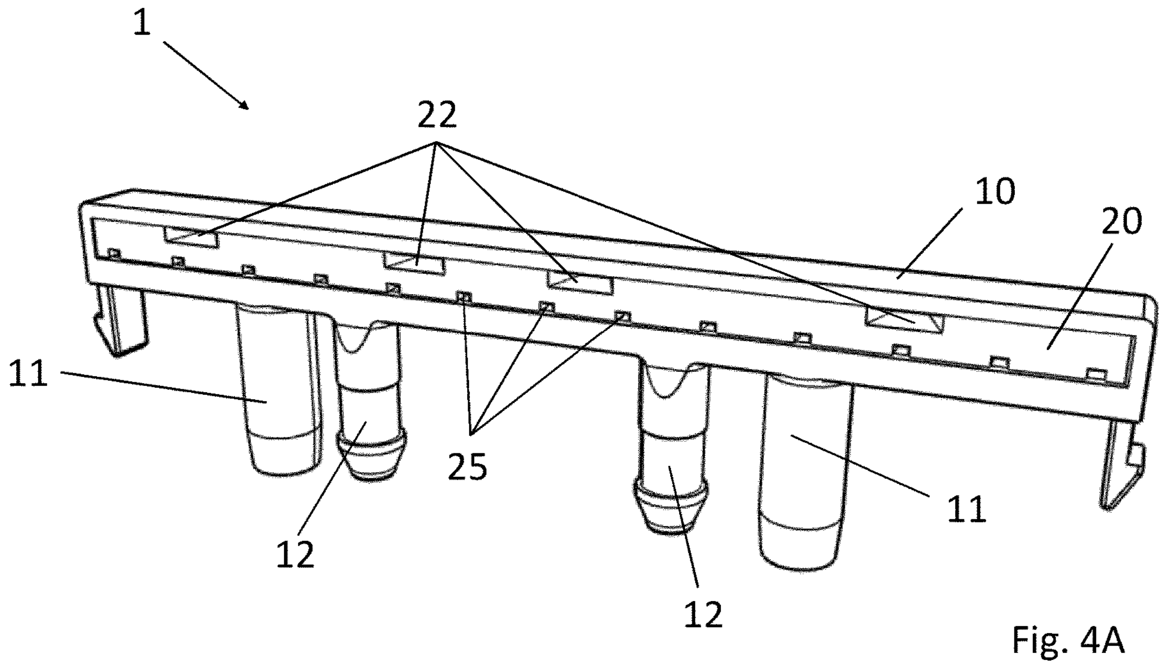
Figure 4B:
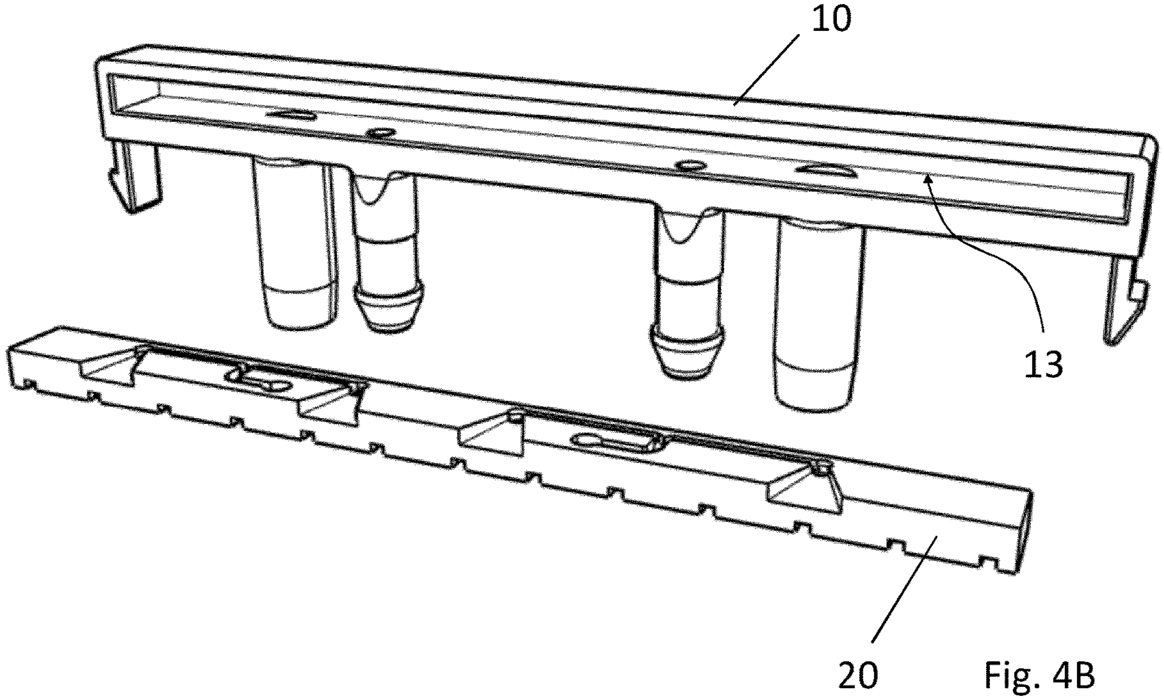
Figure 5A:
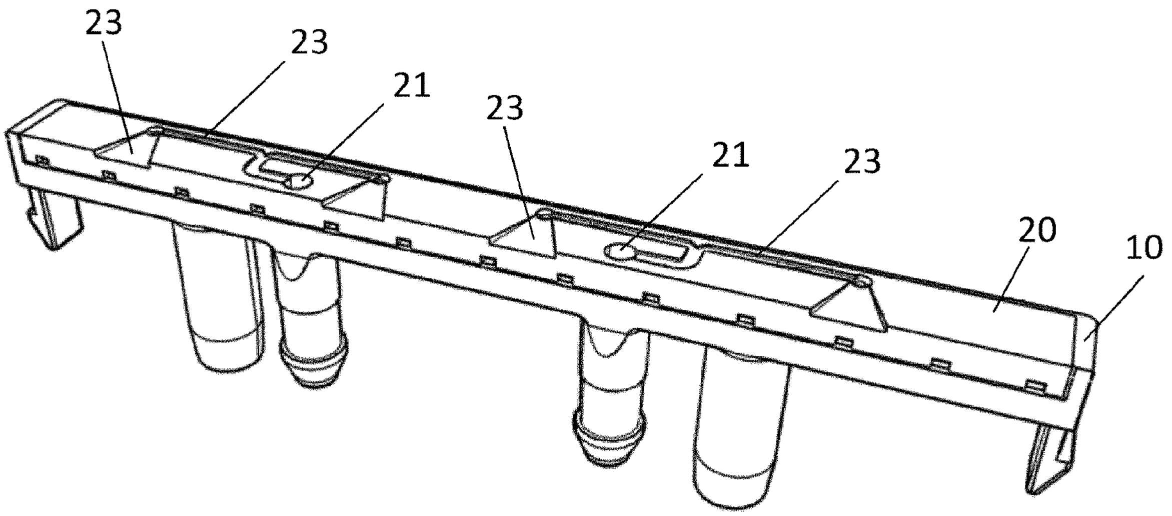
Figure 5B:
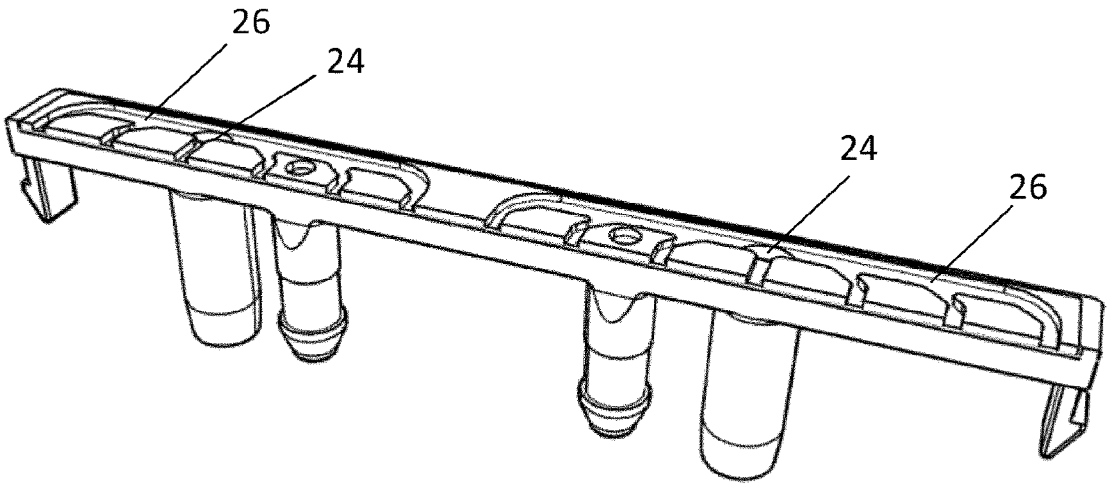

Further advantages, details and features of the present invention are described in the following examples. Thereby, FIG. 1: shows a perspective view of a sensor cleaning device according to a first embodiment of the present invention, wherein the sensor cleaning device is shown in a disassembled condition in which a fluid distribution device is not mounted in a housing of the sensor cleaning device;

FIG. 2A: shows a perspective view of a sensor cleaning device according to a second embodiment of the present invention, wherein the sensor cleaning device is shown in a disassembled condition in which a fluid distribution device is not mounted in a housing of the sensor cleaning device;

FIG. 2B: shows the sensor cleaning device shown in FIG. 3A viewed from a back side of the sensor cleaning device;

FIG. 3A: shows a view onto a front face of sensor cleaning device according to a third embodiment of the present invention exhibiting a plurality of fluid distribution devices;

FIG. 3B: shows a view onto a front face of sensor cleaning device according to a fourth embodiment of the present invention exhibiting a plurality of fluid distribution devices;

FIG. 4A: shows a perspective view of a sensor cleaning device according to a fifth embodiment of the present invention in an assembled condition;

FIG. 4B: shows the sensor cleaning device shown in FIG. 4A in a disassembled condition;

FIG. 5A: shows a perspective view of the sensor cleaning device according to the fifth embodiment of the present invention, wherein the sensor cleaning device is shown along a cross-section through the housing so that an interior region of the sensor cleaning device is visible in the region of two first outlet channels of the fluid distribution device; and FIG. 5B: shows the sensor cleaning device of FIG. 5A along another cross-section through the housing so that an interior region of the sensor cleaning device is visible in the region of a plurality of second outlet channels of a fluid distribution device.

In the following description, the same reference symbols denote identical components and/or identical features. Therefore, a description or explanation of one component carried out with respect to one figure is also valid for the other figures, thus avoiding repetitive description. Furthermore, individual features described in connection with one embodiment can also be used separately in other embodiments.

A first embodiment of a sensor cleaning device 1 according to the present invention will be described with reference to FIG. 1. FIG. 1 shows a perspective view of the sensor cleaning device 1, wherein the sensor cleaning device 1 is shown in a disassembled condition in which a fluid distribution device 20 is not mounted in a housing 10 of the sensor cleaning device 1.

The sensor cleaning device 1 is designed for cleaning a motor vehicle sensor which is not shown in the figures. It can be seen that the sensor cleaning device 1 exhibits a housing 10 with a first housing inlet 11, a second housing inlet 12 and with a housing outlet opening 13. The first housing inlet 11 can be used as a liquid inlet 11 for letting a liquid (e.g. water or cleaning solution or a mix of water and air) into the housing 10. The second housing inlet 12 can be used as a gas inlet 12 and an air inlet 12, respectively, for letting a gas (e.g. air or another gas) into the housing 10. The first housing inlet 11 and the second housing inlet 12 are each designed as an inlet nozzle.

The housing outlet 13 is designed for dispensing fluid introduced into the housing 10 via the first housing inlet 11 and/or the second housing inlet 12. For guiding fluid, i.e. by way of example water and air, from the first housing inlet 11 and the second housing inlet 12 to the housing outlet opening 13 the sensor cleaning device 1 exhibits a fluid distribution device 20 for guiding fluid, which is introduced into the housing 10 via the first housing inlet 11 and the second housing inlet 12, to the housing outlet opening 13. The fluid distribution device 20 exhibits a first distribution inlet 21 and at least one first distribution outlet 22 and a second distribution inlet 24 and at least two second distribution outlets 25. In the shown embodiment the fluid distribution device 20 exhibits five second distribution outlets 25. In the shown embodiment the first distribution inlet 21 and the second distribution inlet 24 are both designed as through openings through the fluid distribution device 20.

The fluid distribution device 20 is insertable into the housing 10. When the fluid distribution device 20 is inserted into the housing 10 the first distribution inlet 21 is in fluid communication with the first housing inlet 11 and the second distribution inlet 24 is in fluid communication with the second housing inlet 12. The first distribution inlet 21 is in fluid communication with the first distribution outlet opening 22 and the second distribution inlet 24 is in fluid communication with all second distribution outlets 25.

Since the first distribution inlet 21 is in fluid communication with the first housing inlet 11 and the second distribution inlet 24 is in fluid communication with the second housing inlet 12, when the fluid distribution device 20 is inserted into the housing 10, fluid introduced via the first housing inlet 11 is dispensed through the housing outlet opening 13 via the first distribution outlet 22, and fluid introduced via the second housing inlet 12 is dispensed through the housing outlet opening 13 via the second distribution outlets 25.

As can be seen in FIG. 1 the first distribution outlet 22 is fluidically connected with the first distribution inlet 21 via a first outlet channel 23. In the shown embodiment the cross section of the first outlet channel 23 increases in a direction from the first distribution inlet 21 to the first distribution outlet (22).

The fluid distribution device 20 exhibits a distribution chamber 27 into which the second distribution inlet 24 ends. Each of the second distribution outlets 25 is fluid-connected with the distribution chamber 27 via a second outlet channel 26.

The first outlet channel 23 and the second outlet channels 26 are realized by recesses in the fluid distribution device 20. The distribution chamber 27 also is realized by a recess 27 in the fluid distribution device 20.

The fluid distribution device 20 of the sensor cleaning device 1 according to the first embodiment of the present invention is designed such that the first outlet channel 23 and the second outlet channels 26 are directed towards each other.

As shown in FIG. 1 the fluid distribution device 20 is insertable into the housing 10 via the housing outlet opening 13.

FIG. 2A shows a perspective view of a sensor cleaning device 1 according to a second embodiment of the present invention. FIG. 2A shows the sensor cleaning device 1 from a front side wherein the sensor cleaning device 1 is shown in a disassembled condition in which the fluid distribution device 20 is not mounted in the housing 10 of the sensor cleaning device 1. FIG. 2B shows the sensor cleaning device 1 according to the second embodiment from a back side.

The sensor cleaning device 1 according to the second embodiment exhibits the same setup as the sensor cleaning device 1 according to the first embodiment of the present invention except that the fluid distribution device 20 is insertable into the housing 10 via a mounting opening 14 which is positioned opposite to the housing outlet opening 13. Moreover, in the sensor cleaning device 1 according to the second embodiment the fluid distribution device 20 exhibits a lug 28 which is arranged on an edge of the fluid distribution device 20. The lug 28 is useful when the fluid distribution device 20 is removed from the housing 10.

The sensor cleaning device 1 according to the second embodiment moreover exhibits a heating device 15 for heating the first outlet inlet 11 and/or the fluid distribution device 20. The heating device 15 can be provided in every embodiment of the present invention.

According to a third embodiment of the present invention shown in FIG. 3A the sensor cleaning device 1 exhibits more than one fluid distribution device 20 accommodated in the housing 10 of the sensor cleaning device 1.

In the sensor cleaning device 1 shown in FIG. 3A, in the installed state, i.e. when the sensor cleaning device 1 is installed a motor vehicle, the first distribution outlet 22 and the second distribution outlets 25 are arranged on a same horizontal level.

According to a fourth embodiment of the present invention shown in FIG. 3B the sensor cleaning device 1 exhibits more than one fluid distribution device 20 accommodated in the housing 10 of the sensor cleaning device 1. In the sensor cleaning device 1 shown in FIG. 3B, in the installed state, i.e. when the sensor cleaning device 1 is installed a motor vehicle, the first distribution outlet 22 and the second distribution outlets 25 are arranged on different horizontal levels.

FIG. 4A shows a perspective view of a sensor cleaning device 1 according to a fifth embodiment of the present invention in an assembled condition. FIG. 4B shows the sensor cleaning device 1 shown in FIG. 5A in a disassembled condition where the fluid distribution device 20 is disassembled from the housing 10.

The sensor cleaning device 1 according to the fifth embodiment exhibits two first housing inlets 11 and two second housing inlets 12. Fluid introduced into the housing 10 via the first housing inlets 11 and/or the second housing inlets 12 is dispensable through the housing outlet opening 13.

FIG. 5A shows a perspective view of the sensor cleaning device 1 according to the fifth embodiment, wherein the sensor cleaning device 1 is shown along a cross-section through the housing 10 so that an interior region of the sensor cleaning device 1 is visible in the region of two first outlet channels 23 of the fluid distribution device 20. FIG. 5B shows the sensor cleaning device 1 of FIG. 5A along another cross-section through the housing 10 so that an interior region of the sensor cleaning device 1 is visible in the region of a plurality of second outlet channels 26 of a fluid distribution device 20.

Each first distribution outlet 22 is in fluid communication with a first distribution inlet 21 via a first outlet channel 23, and each second distribution outlet 25 is in fluid communication with a second distribution inlet 24 via a second outlet channel 26.

The fluid distribution device 20 of the sensor cleaning device 1 according to the fifth embodiment exhibits two first distribution inlets and four first distribution outlets 22. Moreover, the fluid distribution device 20 exhibits two second distribution inlets 24 and a plurality of second distribution outlets 25. Each first distribution inlet 21 is in fluid communication with one first housing inlet 11 and each second distribution inlet 24 is in fluid communication with one second housing inlet 12 when the fluid distribution device 20 is inserted into the housing 10.

REFERENCE SIGNS

1 Sensor cleaning device
10 housing
11 first housing inlet
12 second housing inlet
13 housing outlet opening
14 mounting opening

15 heating device
20 fluid distribution device
21 first distribution inlet
22 first distribution outlet
23 first outlet channel
24 second distribution inlet
25 second distribution outlet
26 second outlet channel
27 distribution chamber
28 lug
L length of a second outlet channel

The invention claimed is:

1. A sensor cleaning device for cleaning a motor vehicle sensor, the sensor cleaning device comprising:
- a housing including:
  - at least one first housing inlet used as a liquid inlet for letting a liquid into the housing,
  - at least one second housing inlet used as a gas inlet for letting a gas into the housing, and
  - a housing outlet opening for dispensing fluid introduced into the housing via the at least one first housing inlet and/or the at least one second housing inlet; and
- a fluid distribution device for guiding the fluid to the housing outlet opening, wherein the fluid distribution device includes:
  - a quantity of first distribution inlets corresponding to a quantity of the at least one first housing inlet,
  - a quantity of first distribution outlets corresponding to at least the quantity of the first distribution inlets,
  - a quantity of second distribution inlets corresponding to a quantity of the at least one second housing inlet,
  - a quantity of second distribution outlets corresponding to at least twice the quantity of the second distribution inlets, and
  - at least one distribution chamber into which a second distribution inlet of the quantity of second distribution inlets ends, each of the second distribution outlets being fluidly connected with the at least one distribution chamber via a second outlet channel,
- wherein the fluid distribution device is insertable into the housing,
- wherein each first distribution inlet is in fluid communication with a corresponding first housing inlet of the quantity of the at least one first housing inlet, and each second distribution inlet is in fluid communication with a corresponding second housing inlet of the quantity of the at least one second housing inlet, when the fluid distribution device is inserted into the housing, and
- wherein a sum of respective cross sectional areas of all second outlet channels ranges from 0.5 $mm^2$ to 3 $mm^2$.

2. The sensor cleaning device according to claim 1, wherein each first distribution outlet is fluidly connected with a corresponding first distribution inlet of the quantity of first distribution inlets via a first outlet channel.

3. The sensor cleaning device according to claim 2, wherein a cross section of the first outlet channel increases in a direction from each first distribution inlet to the corresponding first distribution outlet.

4. The sensor cleaning device according to claim 1, wherein the second outlet channel has a length (L) ranging from 2 mm to 6 mm.

5. The sensor cleaning device according to claim 1, wherein the respective cross sectional areas of at least two second outlet channels are different.

6. The sensor cleaning device according to claim 1, wherein the first outlet channel and the second outlet channel are directed towards each other.

7. The sensor cleaning device according to claim 1, wherein the fluid distribution device is insertable into the housing via the housing outlet opening.

8. The sensor cleaning device according to claim 1, wherein the fluid distribution device is insertable into the housing via a mounting opening.

9. The sensor cleaning device according to claim 1, wherein the fluid distribution device includes at least one locking member for positively connecting the fluid distribution device with the housing.

10. The sensor cleaning device according to claim 1, further comprising a heating device for heating the at least one first housing inlet and/or the fluid distribution device.

11. The sensor cleaning device according to claim 1, wherein the fluid distribution device is at least partially built from a metal.

12. The sensor cleaning device according to claim 1, further comprising more than one fluid distribution device accommodated in the housing.

13. A sensor cleaning device for cleaning a motor vehicle sensor, the sensor cleaning device comprising:
- a housing including:
  - at least one first housing inlet used as a liquid inlet for letting a liquid into the housing,
  - at least one second housing inlet used as a gas inlet for letting a gas into the housing, and
  - a housing outlet opening for dispensing fluid introduced into the housing via the at least one first housing inlet and/or the at least one second housing inlet; and
- a fluid distribution device for guiding the fluid to the housing outlet opening, wherein the fluid distribution device includes:
  - a quantity of first distribution inlets corresponding to a quantity of the at least one first housing inlet,
  - a quantity of first distribution outlets corresponding to at least the quantity of the first distribution inlets,
  - a quantity of second distribution inlets corresponding to a quantity of the at least one second housing inlet, and
  - a quantity of second distribution outlets corresponding to at least twice the quantity of the second distribution inlets,
- wherein the fluid distribution device is insertable into the housing,
- wherein each first distribution inlet is in fluid communication with a corresponding first housing inlet of the quantity of the at least one first housing inlet, and each second distribution inlet is in fluid communication with a corresponding second housing inlet of the quantity of the at least one second housing inlet, when the fluid distribution device is inserted into the housing,
- wherein the fluid distribution device further includes at least one distribution chamber into which a second distribution inlet of the quantity of second distribution inlets ends, and each of the second distribution outlets is fluidly connected with a distribution chamber via an outlet channel, and
- wherein a cross sectional area of the outlet channel ranges from 0.5 $mm^2$ to 3 $mm^2$.

14. The sensor cleaning device according to claim 13, wherein each first distribution outlet is fluidly connected with a corresponding first distribution inlet of the quantity of first distribution inlets via an additional outlet channel.

15. The sensor cleaning device according to claim 14, wherein a cross section of the additional outlet channel increases in a direction from each first distribution inlet to the corresponding first distribution outlet.

16. The sensor cleaning device according to claim 13, wherein the outlet channel has a length (L) ranging from 2 mm to 6 mm.

17. The sensor cleaning device according to claim 13, wherein respective cross sectional areas of at least two outlet channels are different.

* * * * *